United States Patent

Higdon et al.

[11] 4,091,567
[45] * May 30, 1978

[54] FLOWER MOUNTING DEVICE

[76] Inventors: Mary Kathryn Higdon; Zalita Higdon Speas, both of 1324 E. Grand, Ponca City, Okla. 74601

[*] Notice: The portion of the term of this patent subsequent to Mar. 15, 1994, has been disclaimed.

[21] Appl. No.: 721,808

[22] Filed: Sep. 9, 1976

Related U.S. Application Data

[63] Continuation of Ser. No. 586,989, Jun. 16, 1975, Pat. No. 4,011,677.

[51] Int. Cl.² ............................................. A01G 5/00
[52] U.S. Cl. ....................................................... 47/55
[58] Field of Search .................... 47/41, 55; 428/22; 24/5, 6; 248/27.8

[56] References Cited

U.S. PATENT DOCUMENTS

| | | | |
|---|---|---|---|
| 877,324 | 1/1908 | Gilbert | 131/245 |
| 1,811,205 | 6/1931 | Lee | 131/245 |
| 2,331,440 | 10/1943 | Thomas | 47/55 |
| 2,583,237 | 1/1952 | Stegena | 47/55 |
| 2,741,049 | 4/1956 | Meldrum | 47/55 |
| 2,741,050 | 4/1956 | Wittman | 47/55 |
| 3,150,462 | 9/1964 | Gallo | 47/55 |
| 3,243,336 | 3/1966 | Auge | 47/41 X |
| 3,452,476 | 7/1969 | Kise | 428/22 X |
| 3,747,269 | 7/1973 | Adams | 47/55 |
| 3,760,460 | 9/1973 | Myers | 24/5 |
| 4,011,677 | 3/1977 | Higdon et al. | 47/55 |

Primary Examiner—Edgar S. Burr
Assistant Examiner—James R. Feyrer
Attorney, Agent, or Firm—F. Lindsey Scott

[57] ABSTRACT

A flexible body means having a substantially conical-shaped bristle means positioned on one of its ends for maintaining a flower on said end of said body means.

2 Claims, 5 Drawing Figures

U.S.Patent  May 30, 1978  Sheet 1 of 2  4,091,567

FLOWER MOUNTING DEVICE

This application is a continuation of application, Ser. No. 586,989, filed June 16, 1975 and issued Mar. 15, 1977 as U.S. Pat. No. 4,011,677.

BACKGROUND OF THE INVENTION

1. Field of the Invention:

This invention relates to corsage frames. In one aspect, the invention relates to corsage frames which can readily be prefabricated and maintained in inventory until required for use. In another aspect, the present invention relates to corsage frames which can be repeatedly used by mere substitution of fresh flowers. In yet another aspect, the present invention relates to a multi-flower corsage frame which can be modified to a single flower corsage frame without damage to the original multi-flower frame.

2. Brief Description of the Prior Art

The making of corsages is a tedious, time consuming practice required of every full-service florist. This is particularly true when a large number of corsages must be assembled for a community event, such as a school prom, or on special occassions, such as Mother's Day. In an effort to overcome the difficulties of corsage making, numerous corsage frames have been proposed by the prior art. However, such prefabricated frames have not been well accepted by the florists because of the difficulty of maintaining the flower on the frame. For example, a major concern of the florist is that the flowers of the corsage will become detached when the wearer is at a dance or prolonged party. Further, the prefabricated frames of the prior art are not readily adapted to be used with any flower, whether same be a carnation, a rose, an iris, or a hybrid or cymbidium orchid. In addition, most of the prior art frames are not constructed in a manner to provide a custom design appearance, thus causing the florist to spend much time and materials to substantially modify the prefabricated frame prior to use.

OBJECTS OF THE INVENTION

An object of the present invention is to provide an attractive pre-formed corsage frame designed to hold flowers thereon in a secure manner to preclude accidental loss of the flowers from the corsage.

Another object of the invention is to provide a corsage frame which can be reused by the wearer without detriment to the frame.

Another object of the invention is to provide a corsage frame which can be readily modified by the wearer to substantially change the corsage's appearance, as well as the number of flowers in the corsage, without destroying, damaging or causing any substantial wear on the corsage frame.

Yet another object of the invention is to provide a pre-formed corsage frame which is simple to use, thus enabling an inexperienced person to asemble attractive corsages which are durable and economical in construction.

These and other objects, advantages and features of the present invention will become apparant to those skilled in the art from a reading of the following detailed description.

BRIEF DESCRIPTION OF THE DRAWINGS

Drawings accompany and are a part of this disclosure. These drawings depict preferred specific embodiments of the corsage frame of the invention, and it is to be understood that the drawings are not to unduly limit the scope of the invention. In the drawings.

Figure 1:
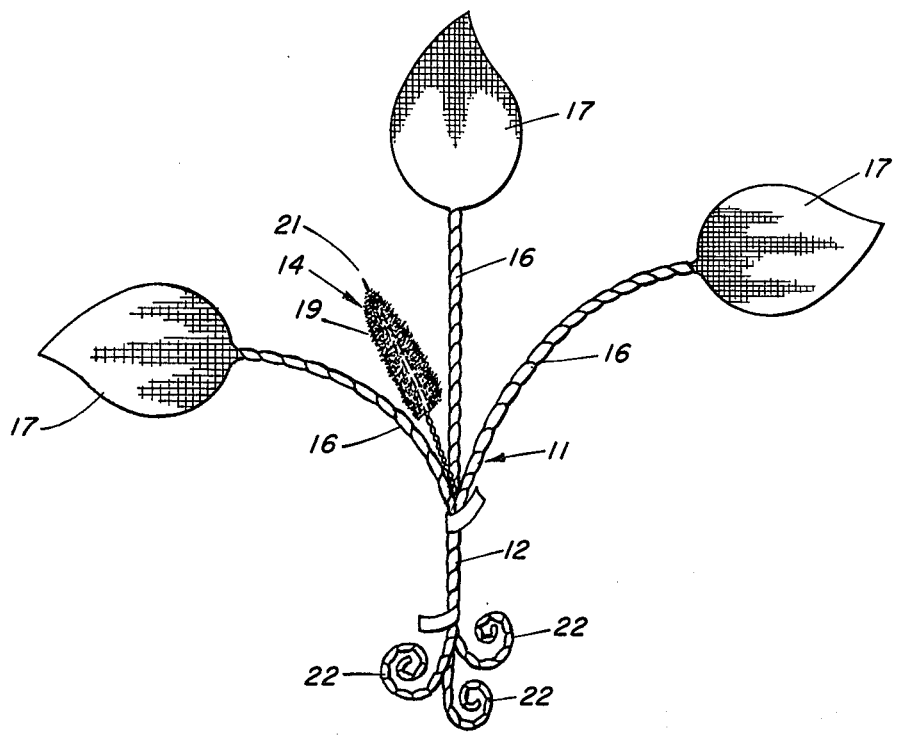
FIG. 1 is a perspective view of the corsage frame of the present invention.

In the following discussion and description of the invention reference will be made to the drawings wherein the same reference numerals will be used to indicate the same or similar parts and/or structure. The discussion and description is of specific embodiments of the corsage frame of the invention, and it is to be understood that the discussion and description is not to unduly limit the scope of the invention.

DETAILED DESCRIPTION OF THE INVENTION

Figure 2:
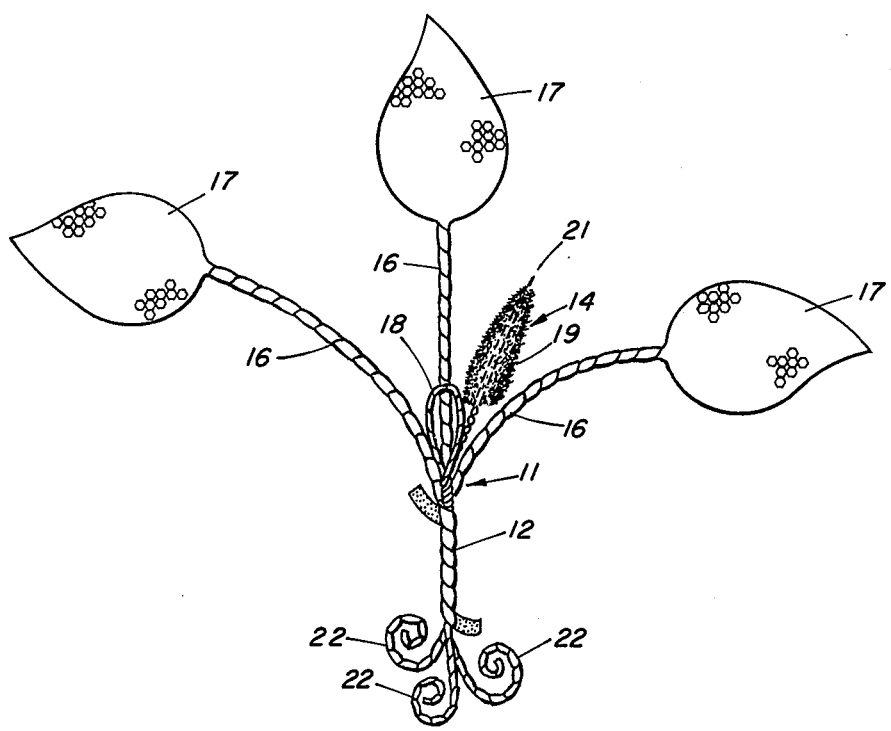
FIG. 2 is a second perspective view of the corsage frame of FIG. 1.

With reference now to the drawing, and particularly to FIGS. 1 and 2, there is shown a corsage frame 11 having a flexible body means 12, a bristle means 14, a plurality of stem means 16 and leaf means 17. Eyelet means 18, formed as an integral part of body means 12, is positioned on the rearward side of corsage frame 11 to facilitate attachment of a completed corsage to the clothing or accessories of the person wearing the corsage.

Figure 4:
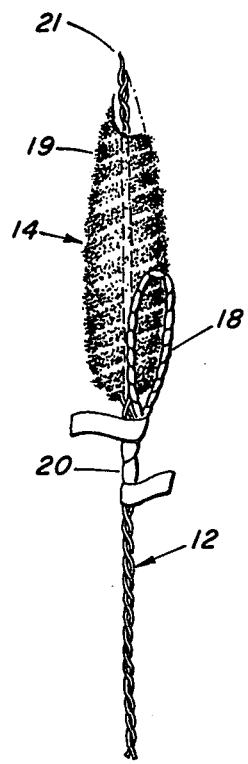
FIG. 4 is an enlarged perspective view of flexible body member and bristle means of the corsage frame of FIG. 1.

Referring also to FIG. 4, flexible body means 12 comprises a spirally wound multi-strand wire member having a one end portion thereof bristle means 14, eyelet means 18 at a position intermediate therein, and an elongated body member 20. Eyelet means 18 can be formed by any suitable means provided same is constructed so as to be an integral part of body means 12. For example, especially desirable results have been obtained wherein elongated body member 20 is looped at the desired location for eyelet means 18 and thereafter florist's tape is employed to secure the segments of body member 20 together while exercising care that eyelet means 18 is left exposed.

The most critical feature of body means 12 is bristle means 14 which is designed to be inserted into the flower's receptical and thus secure the flower to corsage frame 11. Bristle means 14 is provided with a plurality of bristles 19 having a helical configuration. Bristles 19 are further characteristed as being formed in the shape of a cone with apex 21 of said cone being formed so that only one of the wires of body means 12 forms the point. It should be noted that the combination of the conical shape and helical configuration of bristle means 14 is essential if one is to obtain a corsage frame which will securely retain flowers in place on said frame.

Figure 3:
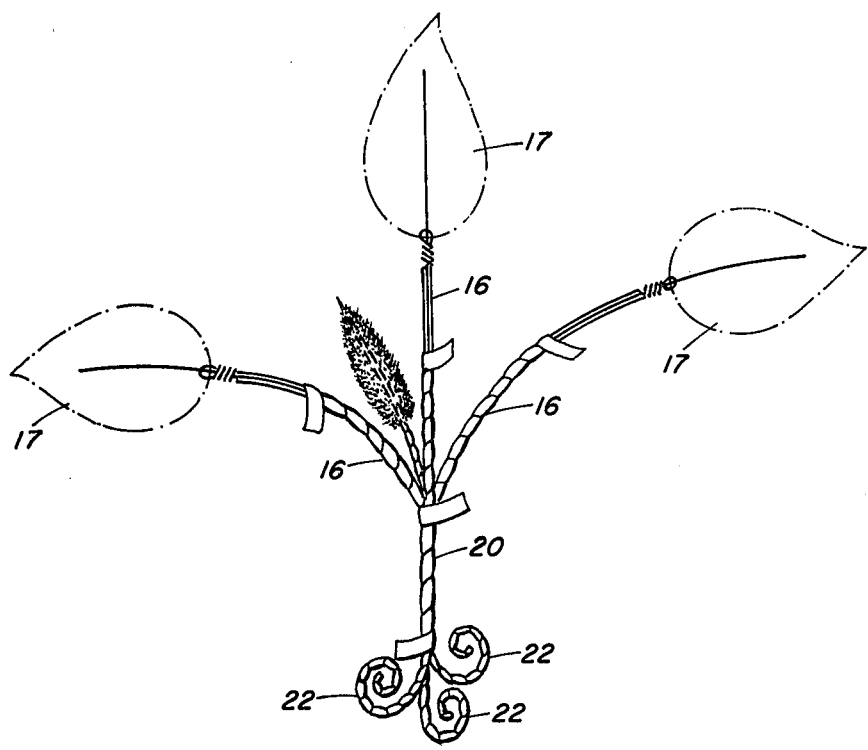
FIG. 3 is a cut away perspective view of the corsage frame of FIG. 1.

Referring now to FIG. 3 in conjunction with FIG. 1, leaf means 17 are secured to one end portion of each of stem means 16, the remaining end potions of stem means 16 being allowed to extend below body member 20 so that the extended end portion 22 of stems means 16 can be formed into an artistic designed as shown. Stem means 16 are then secured to body member 20 by any suitable means, such as florist's tape, in a manner that allows the end portions of stem means 16 containing leaf means 17 extend upwardly and outwardly from body member 20.

Figure 5:
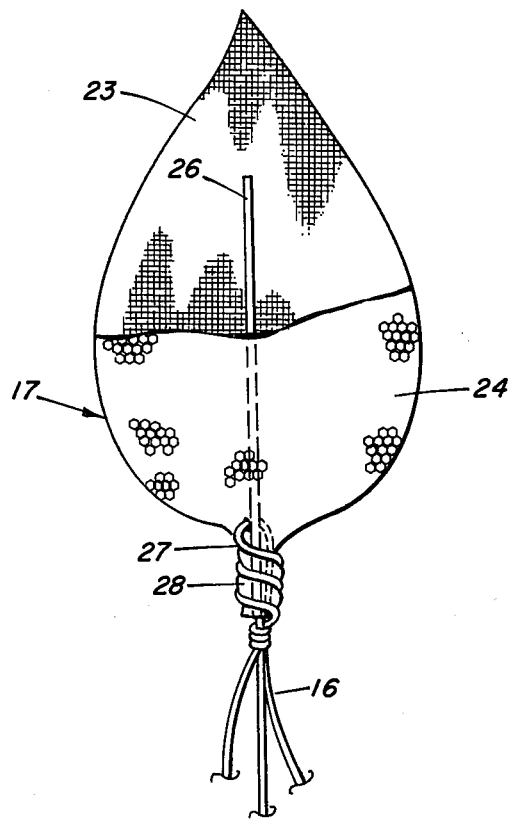
FIG. 5 is an enlarged cut away perspective view of the leaf and stem portions of the corsage frame of the present invention.

Leaf means 17 can be synthetic commercial leaves currently available to the florist or a custom made reversible leaf such as shown in FIG. 5. In this embodiment leaf means 17 is formed of a first layer of material 23, which function a background material, such as water-proof velvet, and a second layer of material 24, which serves as a facing material, such as lace. The two materials are securely sealed together and one end portion of stem means 16 is securely positioned therebetween.

Stem means 16 consists of a first wire member 26, one end portion of which is inserted into leaf 17 between the layers of material for a distance of at least one-half the length of said leaf. A second wire member 27 is inserted through the base portion 28 of leaf 17 and looped around first wire member 26. The end portions of second wire member 27 are then secured, such as by twisting, to first wire member 26 and base portion 28 of leaf 17 and then allowed to extend along the body portion of first wire member 26. The base portion 28 of leaf 17, first wire member 26, and the end portions of second wire member 27 are the coated and secured together by any suitable means, such as by wrapping with floral tape as shown in FIGS. 1, 2 and 3. It should be noted that, even if employing commercial leaves and stems, we have found that the use of second wire member 27 is important to prevent loss of leaves. The same procedure described above as to the use of second wire member 27 and wrapping with such artificial leaves is followed.

In practice, the corsage frames will, of course, vary in make up and form. For example, a ribbon can be secured to the lower portion of body member 20 when desired, and such can be used in conjunction with a back ornament which is fashioned from decoratively arranged maline net to provide the desired rosette-like background for the corsage frame and the intervening flower. Further, if one desires a multi-flower corsage frame, one merely secures the desired number of flesible body members together, each containing a bristle means and a eyelet means, and thereafter secures the stem means containing the leaves to the enlarge multi-flower holding body means. Further, when employing leaves as shown in FIG. 5, the appearance of the corsage frame 11 can readily be changed by turning the leaves to provide a second appearance to the leaves. For example, one may desire the appearance created by the lace facing of the leaves at one time while at a later date the less formal appearance created by the reverse side of the leaves may be desired. Such can readily be accomplished by turning or twisting the leaves to the desired side a facing. It should further be noted that by employing the unique bristle means of the present invention, flowers can be firmly affixed, without fear of accidental loss. Thereafter, the wilted flowers can be readily removed and when desired, at a later date, fresh flowers can again be firmly affixed to the corsage frame. Another important feature and advantage of our improved corsage frame is that a multi-flower corsage frame can be readily modified to a corsage frame for a lesser number of flowers by simply bending the desired number of bristle means downward along the flexicle body member and positioning a leaf in front of said fold bristle means.

While the foregoing discussion and description has been made in connection with certain preferred specific embodiments of the improved corsage frame of the present invention, it is to be understood that minor variations can be made in the corsage frame departing from the invention. For example, one may desire, from time to time, to modify the appearance of the corsage by employing a background of natural foliage or the like, without departing from the invention. Thus, it is to be understood that the discussion and description is only intended to illustrate and teach those skilled in the art how to practice the invention, and such is not to unduly limit the scope of the invention, which is defined in the claims set forth hereinafter.

Having thus described the invention, we claim:

1. A device for mounting a flower, said device consisting essentially of:
   (a) means for mounting a flower, said means comprising a flexible body means including a spirallywound multi-strand wire member; and
   (b) a bristle means positioned on a first end of said flexible body means, said bristle means comprising a plurality of bristles arranged in a helical configuration on said first end of said flexible body means, said bristle means having a conical configuration with the apex of said cone forming a point at said first end of said flexible body means.

2. The device of claim 1 wherein said device includes an eyelet means positioned intermediate said first end of said flexible body means and its second end.

* * * * *